United States Patent [19]
Feterl

[11] 3,892,202
[45] July 1, 1975

[54] BALE HANDLING AND FEEDING CONTAINER

[76] Inventor: Leon G. Feterl, 411 W. Center, Salem, S. Dak. 57059

[22] Filed: Mar. 18, 1974

[21] Appl. No.: 452,440

[52] U.S. Cl. .................................. 119/60; 214/372
[51] Int. Cl. ................................................ A01k 5/00
[58] Field of Search .......... 119/20, 58, 60; 214/372, 214/620, 621, 505

[56] References Cited
UNITED STATES PATENTS

| | | | |
|---|---|---|---|
| 1,084,930 | 1/1914 | Eckelberg | 119/58 X |
| 2,729,196 | 1/1956 | Breitenbach | 119/20 |
| 2,792,141 | 5/1957 | Lopes | 214/621 |
| 3,298,550 | 1/1967 | Schitz | 214/505 |
| 3,376,987 | 4/1968 | Lohse | 214/505 |

FOREIGN PATENTS OR APPLICATIONS 777,945  7/1957  United Kingdom.................. 119/60

Primary Examiner—Louis G. Mancene
Assistant Examiner—J. N. Eskovitz
Attorney, Agent, or Firm—Williamson, Bains & Moore

[57] ABSTRACT

An upright container having feeding openings in the sides and a front loading opening is used to pick up extremely large hay bales by inserting pickup arms on the bottom wall of the container under a hay bale, with the container being held and manipulated during pick up and bale transporting operations by a power lift device on a tractor. After a bale is loaded into the container, gates on the front end of the container are swung closed, and the container is transported by the tractor to a cattle feeding lot, where it is deposited with the bale in it for the feeding of cattle.

9 Claims, 5 Drawing Figures

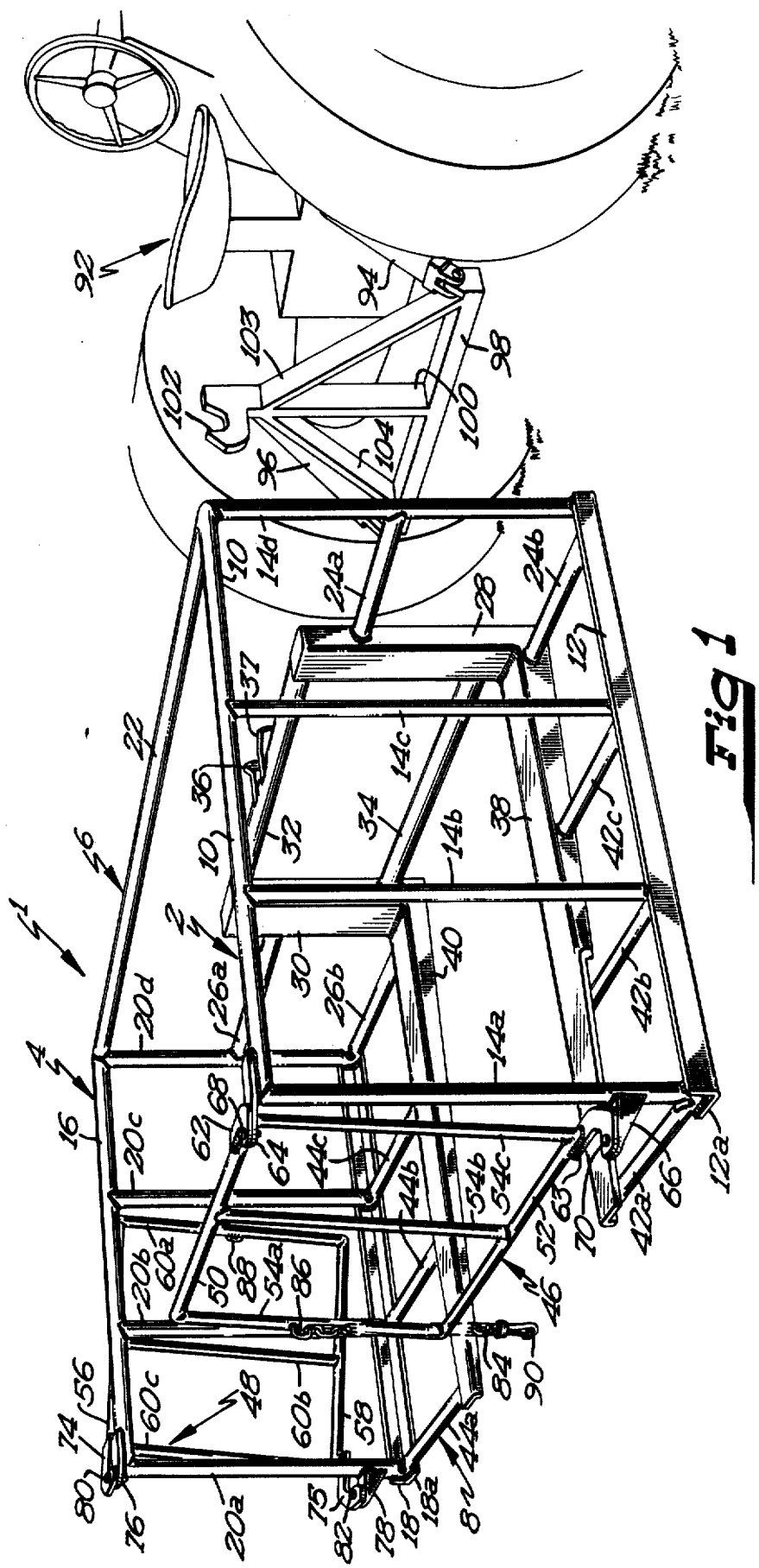

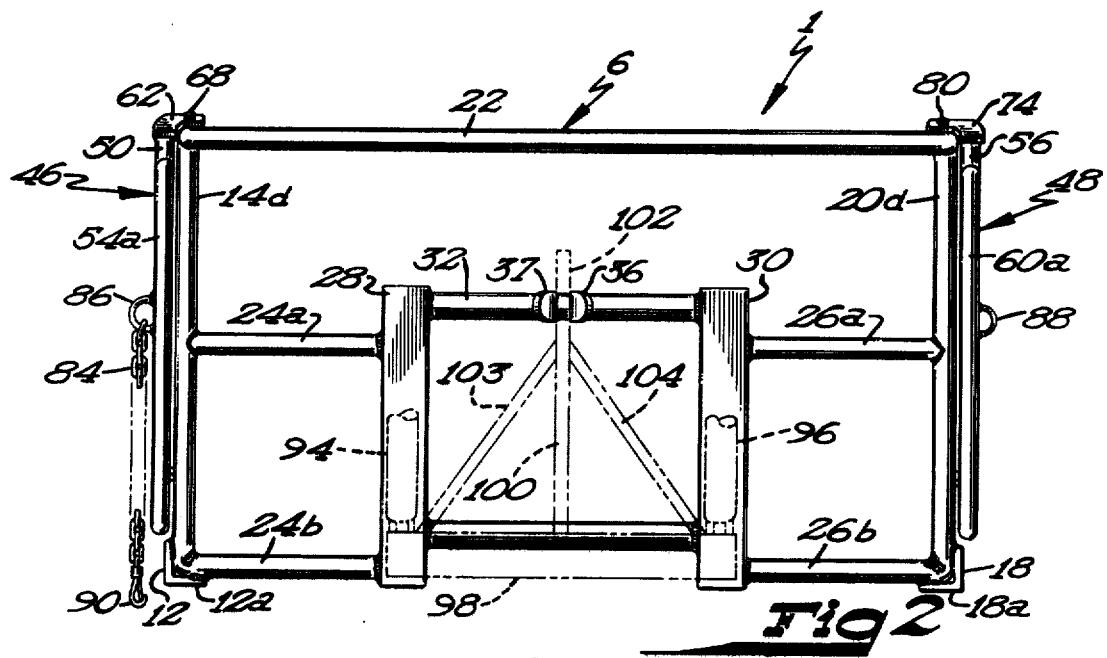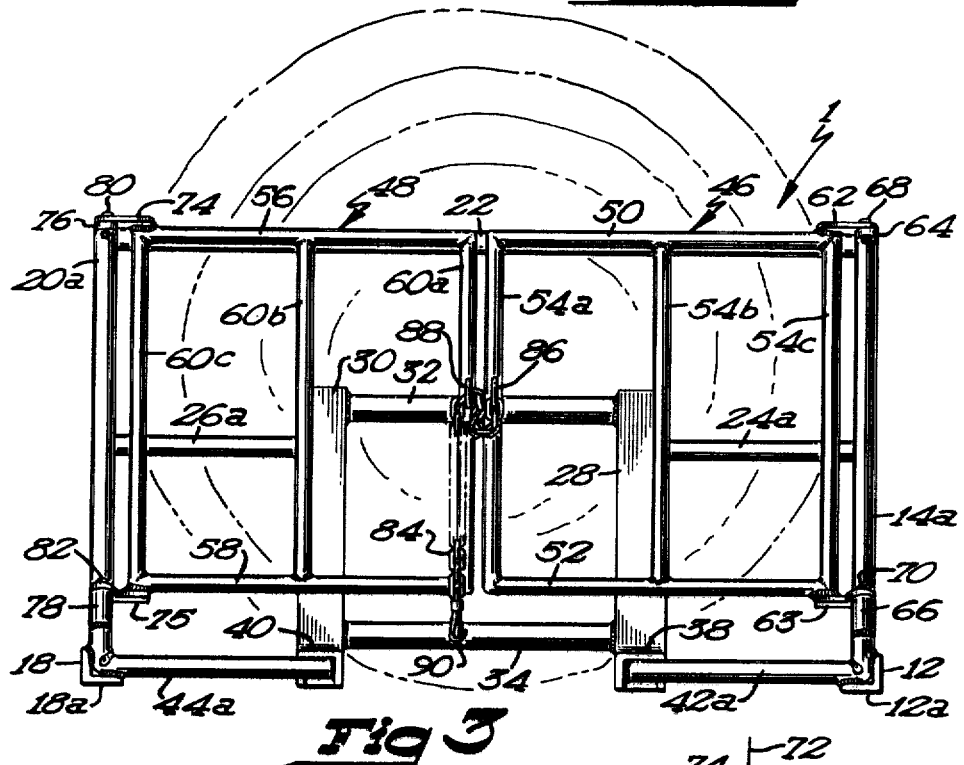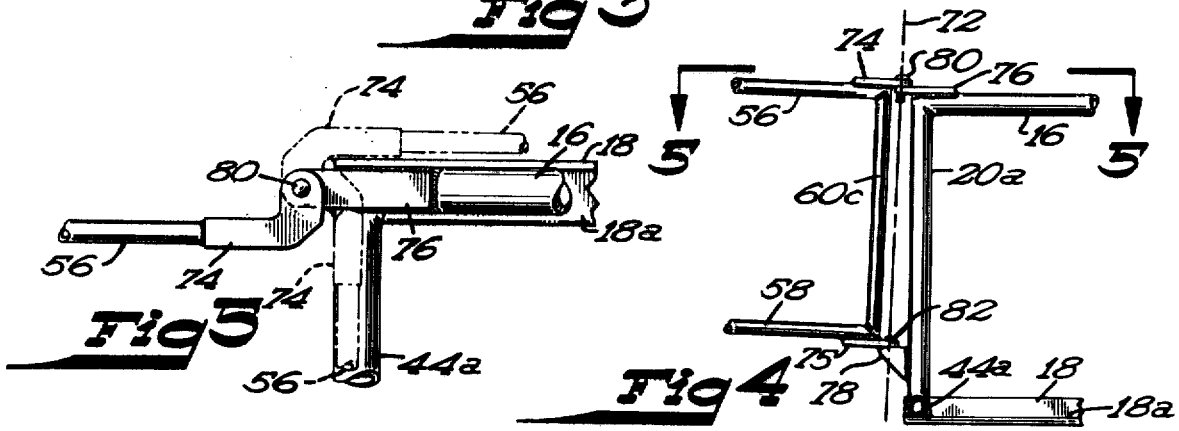

BALE HANDLING AND FEEDING CONTAINER

BACKGROUND OF THE INVENTION

Pickup devices of various kinds have been used for handling and transporting hay bales. For example, power operated lift forks mounted on a tractor or other vehicle are frequently employed to pick up the large hay bales now being widely used to feed cattle. However, in order to accomplish the controlled feeding desired and required with such large hay bales, which are commonly on the order of 1,000 lbs. in weight, the bale must be placed in some kind of feeding container or enclosure after it has been transported to a feed lot.

I have developed a bale handling container which advantageously serves both as a pickup and transporting device for moving a large hay bale to a feed lot, and as a feeding container from which cattle may consume, in a restricted manner, a large bale held within the container.

BRIEF SUMMARY OF THE INVENTION

The bale handling container of this invention is particularly characterized by a bottom wall structure having elongated bale lift means thereon for lifting and loading a large hay bale through an open front end of the container closeable by hinged gate means attached to the front end of the container. These features, in combination with feed openings in the walls of the container and a lift beam structure on the container rear wall specially designed to accommodate a power lift device mounted on a tractor, permit the container to serve the dual functions of a pickup and carrying device and a controlled access feeding container for large hay bales.

The aforesaid bale lift means preferably takes the form of two, spaced apart, elongated arms positioned inwardly from the containers upright side walls and extending forwardly from the rear wall of the container to its front end opening. With the front end of the container opened, the lift arms may be inserted under a hay bale to elevate it and load it into the container through the open front end. A pair of front end gate sections are hingedly attached to the front ends of the container side walls in such a way that they may be swung open to rearwardly extending positions along the side walls of the container where they will be completely out of the way during a bale pickup operation utilizing the aforesaid lift arms.

The aforesaid bale loading operation is accomplished by engaging a horizontal lift beam on the container rear wall structure intermediate its top and bottom extremities by a power lift device mounted on a tractor or other vehicle. With the container thus supported on a vehicle, the vehicle is utilized to thrust the pickup arms on the bottom wall of the container under a large hay bale, as well as to then transport the container with a bale in it to a feed lot where the container and bale are deposited for feeding cattle.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a front, perspective view of the bale handling container of this invention shown in conjunction with a lift device on the back of the tractor which may be utilized for lifting and transporting the container;

FIG. 2 is a rear, elevation view of the bale handling container of FIG. 1;

FIG. 3 is a front, elevation view of the bale handling container of FIG. 1 shown with the front end gates closed;

FIG. 4 is a fragmentary, side elevation view of the front end of one of the container side walls showing the hinge mounting of a gate section thereon; and FIG. 5 is a fragmentary, top plan view of the gate mounting arrangement shown in FIG. 4.

DESCRIPTION OF THE PREFERRED EMBODIMENT

Referring now to the drawings, I have shown in FIG. 1 a preferred form of the bale handling container of this invention, which is generally designated by reference numeral 1. The container is comprised of a pair of upright, spaced apart side walls 2 and 4, a rear wall generally indicated by reference numeral 6, and a floor or bottom wall structure 8. These walls combine to form a generally rectangular shaped container sized to accommodate the large hay bales now widely used in the feeding of cattle. The side walls 2 and 4 will be on the order of 6 feet in length, and the space therebetween along the length of rear wall 6 will be at least as long.

Side walls 2 and 4 are of identical construction. As may best be understood by reference to FIG. 1, the side wall generally indicated by reference numeral 2 is comprised of top and bottom horizontal beam members 10 and 12 between which a plurality of horizontally spaced, upright, rigid support bars 14a, 14b, 14c and 14d extend. Upright bars 14a – 14d are spaced apart from each other a predetermined distance so as to define therebetween a plurality of vertically extending, animal feeding spaces along the length of side wall 2. The spaces between these upright bars are sized so that the head of a stock animal may be inserted therebetween to reach the feeding space inside of the container 1. The container has been particularly designed with a view towards the feeding of cattle, and the height of side walls 2 and 4 will normally be on the order of 4 or 5 feet. Bottom beam 12 of side wall 2 is preferably an angle iron member as shown, having a horizontal, inwardly extending flange 12a on which the bottom end of upright bars 14a – 14d are supported and secured, as by welding. Side wall 4 is of the same construction as side wall 2, and is comprised of top and bottom horizontal beams 16 and 18, and a plurality of horizontally spaced, upright bars 20a, 20b, 20c and 20d which extend therebetween. Upright bars 20a – 20d also define horizontally spaced, vertically elongated feeding spaces through which cattle may feed along side wall 4.

Rear wall 6 is likewise a beam structure, the upper extremity of which is defined by an elongated top bar 22 extending between the top ends of side wall rear, corner posts 14d and 20d. Welded to corner posts 14d and 20d and extending inwardly therefrom are first and second pairs of support bars 24a, 24b and 26a, 26b. At their inner ends, bars 24a, 24b and 26a, 26b are affixed to the outside faces of a pair of spaced apart, upright stanchions 28 and 30. Stanchions 28 and 30 form part of the rear wall structure, and are preferably tubular steel of square configuration as shown in FIGS. 1 and 2. Secured between upright stanchions 28 and 30, as by welding at the upper and lower ends thereof are a pair of horizontal beams 32 and 34. Uppermost beam 32 is supported between the top and bottom extremities of rear wall 6 and serves as a lift beam for engagement by a power actuated lift device mounted on a vehicle for the purpose of lifting and transporting container 1 in a manner hereinafter explained. A pair of outwardly opening, closely spaced guide lugs 36 and 37 are affixed to the rear face of lift beam 32 and project rearwardly therefrom to serve as guide means for a lift device described below.

Upright, rear wall stanchions 28 and 30 are spaced inwardly from side walls 2 and 4 as shown, and advantageously serve as attachment means for bale lift means in the form of a pair of elongated, rigid, pickup arms 38 and 40. Pickup arms 38 and 40 are preferably formed from steel plates, and are welded at their rear ends to the bottom ends of stanchions 28 and 30. Thus, pickup arms 38 and 40 are also spaced inwardly from side walls 2 and 4, in spaced apart relation to each other in the manner shown most clearly in FIG. 1. Rigid pickup arms 38 and 40 extend forwardly from their point of attachment to stanchions 28 and 30 to the loading opening at the front end of container 1 defined between forward posts or bars 14a and 20a of side walls 2 and 4. In order to facilitate their insertion under an elevation of a large hay bale, pickup arms 38 and 40 taper along their height dimensions from rear wall 6 towards their front ends. The space between pickup arms 38 and 40 is completely open, with no support members of any kind extending therebetween, so as to avoid interference with the free movement of arms 38 and 40 under a hay bale. Pickup arms 38 and 40 form part of the bottom wall or floor structure of container 1, and are supported along their lengths by a plurality of horizontally extending, rigid bars 42a, 42b, 42c and 44a, 44b and 44c. These two sets of support bars 42a – 42c and 44a – 44c are affixed at their inner ends, as by welding, to the upright side flanges or walls of arms 38 and 40, and extend outwardly therefrom to points of attachment to the bottom of side walls 2 and 4. Preferably, the outer ends of floor support bars 42a – 42c and 44a – 44c are welded to the upright flange segments. of side wall bottom beams 12 and 18. This structural means of supporting and reinforcing the elongated pickup arms 38 and 40 provides floor segments on the outside of arms 38 and 40 on which a large hay bale can be partially supported, and from which cattle can feed through the openings in side walls 2 and 4. This feature is illustrated in FIG. 3, which shows a large, round hay bale within container 1, primarily supported on arms 38 and 40, and extending outwardly near side walls 2 and 4 over the outer floor segments formed by outwardly extending beams or bars 42a – 42c and 44a – 44c.

Hingedly mounted on the forward ends of side walls 2 and 4 are a pair of swingable gate sections 46 and 48 which are utilized to close the open front end of container 1 between side wall forward posts 14a and 20a. These two gate sections are of identical construction. Gate section 46 is comprised of top and bottom horizontal bars 50 and 52 and a plurality of spaced apart, upright bars 54a, 54b and 54c extending therebetween. Gate Section 48 is likewise comprised of a pair of top and bottom horizontal bars 56, 58 and a plurality of upright, spaced apart bars 60a, 60b and 60c secured therebetween. The upright bars 54a – 54c and 60a – 60c of the two gate sections are spaced apart horizontally a sufficient distance to permit cattle to project their heads through these gate sections and feed on a hay bale inside of container 1.

The hinge mounting arrangement for gate sections 46 and 48 on the front ends of container side walls 2 and 4 is most clearly shown in FIGS. 1, 4 and 5. Attached to the inner ends of top and bottom horizontal bars 50 and 52 of gate 46 are hinge ears 62 and 63 of the generally right angle shape shown. These hinge ears are swingably mounted on the front end of side wall 2 by means of an upper hinge plate 64 welded to top bar 10 and projecting forwardly therefrom, and a lower hinge bracket 66 which is secured to the bottom end of front bar 14a of side wall 2. Hinge pins 68 and 70 extend through ear 62 and plate 64, and through bottom ear 63 and bracket 66, and define together a generally vertically extending pivotal axis 72 about which gate section 46 may be swung between the closed position shown in FIGS. 1 and 3 and a fully open position shown in FIG. 2.

Gate section 48 is swingably supported in essentially the same manner on forward post 20a of side wall 4. Hinge ears 74 and 75 are affixed to the inner ends of top and bottom bars 56 and 58 of gate section 48. A cooperating hinge plate 76 is welded to top bar 16, and a lower hinge bracket 78 is secured to the front face of upright bar 20a of side wall 4 and projects forwardly therefrom in the manner clearly shown in FIG. 4. An upper hinge pin 80 extends through hinge ear 74 and hinge plate 76; and a lower hinge pin 82 extends through bottom hinge ear 75 and hinge bracket 66. These two hinge pins are vertically aligned along a pivot axis 72 about which gate section 48 may be swung between open and closed positions. The pivot axes for both gate sections 46 and 48 incline rearwardly and downwardly from the vertical, as is illustrated with respect to pivot axis 72 for gate section 48 in FIG. 4. With such an inclined pivot axis, each of the gate sections 46 and 48 will be elevated at their outer ends when positioned in a forwardly extending, neutral position coextensive with side walls 2 and 4, as is illustrated with respect to gate section 48 in FIGS. 4 and 5. Thus, any slight, outward swinging movement given to the gate sections 46 and 48 from their forwardly extending neutral positions will cause the gates to swing naturally rearwardly about their pivot axes to an open position. The particular hinge mounting arrangement described above, with the upper hinge plates 64, 76 and lower hinge brackets 66, 78 projecting forwardly from the front end of the container side walls permits the gate sections to pivot from their closed positions across the front opening of container 1 through a fully 270° arc to a fully open position wherein they extend rearwardly along side walls 2 and 4 parallel thereto, without interference with front posts 14a and 20a of the side walls. The rearwardly inclined pivotal axes of gate sections 46 and 48, as is illustrated with respect to pivotal axis 72 of gate section 48 in FIG. 4, imparts a rearward, swinging moment to both gate sections, which tends to hold them in their rearwardly disposed, open positions where they will not interfere with the loading of a hay bale through the open front end of container 1. In FIG. 2, gate sections 46 and 48 are shown in their rearwardly swung, open positions along side walls 2 and 4.

When gate sections 46 and 48 are swung to their inwardly disposed, closed position across the open front end of container 1 as illustrated in FIG. 3, they may be held in that position by various types of fastening devices. I have found that it is particularly desirable to use a length of flexible chain 84 for this purpose. One end of chain 84 is affixed to a retention bracket ear 86 attached to upright bar 54a of gate section 46; and chain 84 is looped through a second bracket ear 88 attached to upright bar 60a of gate section 48. Chain section 48 may be secured in place by fastening spring hook 90 on the end of chain 4 to one of the chain lengths. With the inner ends of gate sections 46 and 48 loosely secured together by means of chain 84, cattle feeding through gate sections 46 and 48 may urge these gate sections inwardly to reach a bale inside of container 1 as it is consumed and diminishes in size.

In FIG. 1, I have illustrated the manner in which container 1 may be lifted up and transported by means of a hydraulically operated lift device on the rear end of a tractor 92. Such lift devices are well known, and commonly employed on farm vehicles. The lift device illustrated in FIG. 1 employs a pair of hydraulic cylinders 94 and 96 attached to the rear end of a tractor in a known manner, and secured at their lower, outer ends to a crossbar 98 of a lift device. An upright support member 100 attached to lift crossbar 98 supports a lift hook 102 at its upper end, upright member 100 being reinforced by angled support struts 103 and 104.

In operation, container 1 would be lifted and held by the lift device shown on the rear end of tractor 92 when it is desired to move a large hay bale from a bale storage area to a feed lot. This is accomplished by backing tractor 92 up to the rear wall 6 of container 1 and raising crossbar 98 of the lift device by means of hydraulic cylinders 94, 96 to engage lift hook 102 with horizontal lift beam 32. This operation is facilitated by rearwardly extending guide lugs 36, 37 which guide the upper end of lift hook stanchion 100 and lift hook 102 to a central position along lift beam 32 in engagement therewith. With the rear wall of container 1 thus engaged on the lift device, container 1 is raised from the ground utilizing lift cylinders 94 and 96, and the tractor and container are maneuvered into position next to a large bale on the ground. The container will be maneuvered by tractor 92, or some other appropriate type of transporting vehicle, to position its front, gate end immediately adjacent to a bale resting on the ground. Then, with gate sections 46 and 48 swung open to their rearwardly extending positions along side walls 2 and 4, the tractor 92 is moved towards the bale with container 1 held so that its bottom wall 8 is substantially at ground level. This will cause lift arms 38 and 40 to be thrust under the hay bale, with the bale being elevated slightly by the inclined, forwardly tapering shape of arms 38 and 40. In this manner the bale is loaded into container 1 through the open front end thereof between front posts 14a and 20a of the side walls. If a large, round bale is being picked up, container 1 will be maneuvered so that lift arms 38 and 40 are thrust under the bale in a direction parallel to the longitudinal, roll axis of the bale. FIG. 3 illustrates such a round bale after it has been loaded into container 1 in such a manner. After a bale is loaded into container 1, gate sections 46 and 48 are swung to their closed positions across the front end opening of the container, and secured in place by means of chain 84 as illustrated in FIG. 3, Hydraulic cylinders 94 and 96 are again utilized to elevate container 1 from the ground; and tractor 92 is then utilized to transport container 1 with a bale in it to a feed lot.

The lift device on the rear end of tractor 92 is then lowered, and container 1 is deposited on the ground with a bale in it, and left in the feed lot. The bale inside of container 1 can then be consumed in a controlled manner by cattle feeding through the open side walls 2 and 4, as well as through the openings in gate sections 46 and 48. After a bale has been completely consumed from container 1, it is again transported back to a storage area for picking up another bale in the same manner as described above.

It is to be noted that the structure of floor or bottom wall 8 described above, comprised of elongated lift arms 38, 40 and bottom wall beams 42a – 42c and 44a – 44c extending outwardly therefrom to side walls 2 and 4 necessarily spaces the upright side walls outwardly from pickup arms 38 and 40. Thus, upright side walls 2 and 4 will not interfere with the loading and pickup action of arms 38 and 40 as they are thrust under a bale. As is illustrated in FIG. 3 with respect to a large, round bale, the bale will be supported mainly on lift arms 38 and 40, and will project outwardly therefrom over floor beams 42a – 42c and 44a – 44c close to side walls 2 and 4.

With respect to the lifting and handling of container 1 by the lift device shown on the back of a tractor, it is to be noted that upright stanchions 28 and 30 serve as stop devices for horizontal lift bar 98. As is illustrated in FIG. 2, the opposite ends of bar 98 of the lift device abut against the bottom ends of stanchions 28 and 30. This has the effect of holding container 1 in an upright position so that its bottom rear end does not swing up when lift hook 102 engages lift beam 32.

Although I have described my bale handling and feeding container with respect to a particular preferred embodiment thereof, I anticipate that various changes can be made in the size, shape and structure of the container without departing from the spirit and scope of my invention as defined by the following claims:

What is claimed is:

1. Bale pickup and feeding apparatus for cattle comprising:

a container having a pair of upright, spaced apart side walls, an upright rear wall extending between said side walls, and a front end with an opening therein opposite said rear wall;

a plurality of vertically extending, animal feeding spaces along the length of said side walls defined by a plurality of horizontally spaced, upright rigid members forming a portion of said side walls, whereby livestock may project their heads through said feeding spaces to feed on a large hay bale within said container;

gate means hingedly mounted on the forward ends of said side walls for swinging movement to a closed position across said front end opening of said container; and elongated bale lift and support means on the bottom of said container comprising a pair of elongated, spaced apart, pickup arms positioned inwardly from said side walls and extending generally parallel thereto from said rear wall toward said open front end of said container for insertion under a large hay bale.

2. Bale pickup and feeding apparatus as defined in claim 1 wherein:

said pickup arms are attached to the bottom of said rear wall, and the space between said pickup arms is completely open to facilitate the insertion of said arms under a large hay bale.

3. Bale pickup and feeding apparatus as defined in claim 1 wherein:

said elongated pickup arms are rigid beams which taper forwardly along their height dimension in a direction from said rear wall towards said front end of said container to facilitate their insertion under a hay bale.

4. Bale pickup and feeding apparatus as defined in claim 1 wherein:

said rear wall includes a rigid, horizontal, lift beam supported intermediate the top and bottom extremities of said rear wall on a pair of upright stanchions which serve as stop devices for engagement by power lift apparatus mounted on a vehicle.

5. Bale pickup and feeding apparatus as defined in claim 1 wherein:

said gate means comprises two gate sections, each of which is swingably mounted on the front end of one of said side walls by hinge means defining vertical axes about which said gate sections may be swung open rearwardly to a fully open position wherein said gate sections extend rearwardly along said side walls generally parallel thereto in an out of the way position wherein they will not interfere with the loading of a hay bale through the front end opening of said container.

6. Bale pickup and feeding apparatus as defined in claim 5 wherein:

said hinge means comprises a pair of upper and lower hinge pins attached to the front end of each of said side walls in alignment with each other along a pivot axis which inclines rearwardly and downwardly from the vertical, with the upper hinge pin more rearwardly disposed than the lower hinge pin, whereby each of said gate sections will be elevated at their outer ends when positioned in a forwardly extending, neutral position generally coextensive with said side walls, and each of said gate sections will thereby have a natural swinging moment imposed thereon tending to urge and hold said gate sections towards said fully open position.

7. Bale pickup and feeding apparatus as defined in claim 5 wherein:

each of said gate sections is comprised of a plurality of vertically extending, animal feeding spaces defined by a plurality of upright bar members horizontally spaced apart a predetermined distance great enough to permit the insertion of the heads of cattle therebetween.

8. Bale pickup and feeding apparatus for cattle comprising:

a container having a pair of upright, spaced apart side walls, an upright rear wall extending between said side walls, and a fully open, front end opposite said rear wall;

a plurality of vertically extending, animal feeding spaces along the length of said side walls defined by a plurality of horizontally spaced, upright rigid members forming a portion of said side walls, whereby livestock may project their heads through said feeding spaces to feed on a large hay bale within said container;

gate means hingedly mounted on the forward ends of said side walls for swinging movement about generally vertical axes to a closed position across said open front end of said container, said gate means comprising two gate sections, each of which is swingably mounted on the front end of one of said side walls by hinge means defining vertical axes about which said gate sections may be swung open rearwardly to a fully open position wherein said gate sections extend rearwardly along said side walls generally parallel thereto in an out of the way position wherein they will not interfere with the loading of a hay bale through said open front end of said container; and elongated bale pickup and support means on the bottom of said container normally engaging the ground and extending in a direction from said rear wall toward said open front end of said container.

9. A method of handling round, rolled hay bales in a cattle feeding operation utilizing an upright bale handling and feeding container having feeding openings for through access by the heads of cattle along one or more sides thereof, said container also having a front end with a bale loading opening across which hinged gates swingably attached to the front end of the container may be closed, and elongated pickup means in the form of a pair of elongated, spaced apart arms on the bottom of the container extending from the container's rear wall towards its front opening, comprising:

lifting the bale handling container by engaging the container with a power operated lift device mounted on a vehicle;

transporting the bale handling container by means of the vehicle into loading position with the gate end of the bale container immediately adjacent to a large, rolled bale resting on the ground;

with the gate swung open and the container held low near the ground on the vehicle lift device, thrusting said pickup arms on the bottom of the container under the bale along and parallel to the round bale's longitudinal roll axis by moving the vehicle towards the bale and thereby loading the bale into the container through said front end opening;

swinging the container gates closed across the front end opening;

lifting the bale handling container by means of the vehicle lift device; and with the container held on the vehicle lift device transporting the container by means of the vehicle to a cattle feed lot and depositing it on the ground and leaving it there with the bale in it for feeding cattle.

* * * * *